(12) United States Patent  (10) Patent No.:  US 8,089,749 B2
Renwick  (45) Date of Patent:  Jan. 3, 2012

(54) EASY OPENING FOLDING TYPE DEVICE

(75) Inventor: James Renwick, Santa Monica, CA (US)

(73) Assignee: Nokia Corporation, Espoo (FI)

( * ) Notice: Subject to any disclaimer, the term of this patent is extended or adjusted under 35 U.S.C. 154(b) by 132 days.

(21) Appl. No.: 12/175,767

(22) Filed: Jul. 18, 2008

(65) Prior Publication Data

US 2010/0014240 A1  Jan. 21, 2010

(51) Int. Cl.
*G06F 1/16* (2006.01)
(52) U.S. Cl. .................. 361/679.06; 235/380; 345/173; 455/566; 720/725
(58) Field of Classification Search ............... 235/380, 235/441; 345/156, 173, 204; 455/575.1, 455/575.5, 566; 248/176, 159, 323; 720/600, 720/725; 16/343; 361/679.05, 679.08, 679.27, 361/679.31, 679.55

See application file for complete search history.

(56) References Cited

U.S. PATENT DOCUMENTS

| 6,353,529 | B1 * | 3/2002 | Cies | 361/679.05 |
| 2008/0141495 | A1 * | 6/2008 | Fisher | 16/343 |
| 2009/0140042 | A1 * | 6/2009 | Clegg | 235/380 |

* cited by examiner

*Primary Examiner* — Hung V Duong

(74) *Attorney, Agent, or Firm* — Perman & Green, LLP

(57) ABSTRACT

A portable electronic device with a first panel and a second panel connected to the first panel. The connection allows the panels to pivot relative to one another between a folded position and an un-folded position. A lock automatically engages and locks the panels when the panels are brought in the folded position and disengages when the panels are displaced relative to one another sidewardly.

11 Claims, 3 Drawing Sheets

EASY OPENING FOLDING TYPE DEVICE

The present application relates to mobile electronic devices that include a housing having at least two panels that are movable relative to one another, in particular to mobile electronic devices that have at least two housing parts that are connected to one another so that they can pivot between position in which the panels are folded together and a position in which the panels are folded open. Commonly, these devices are referred to as flip phones.

BACKGROUND

Mobile electronic devices with two panels that can be moved between a folded position in which a keypad and display are typically concealed and an un-folded position in which the keypad and the display are not concealed that use a pivoting movement are known in the art. When a user wants to open such a known device to unveil the inside of the device, the opening usually happens by inserting the user's thumb or other fingertip in between the panels. Automatic (pushbutton operated) opening mechanisms are also known (spring/motor). Depending on the situation, opening can be a difficult. In particular, the panels of the device need to be designed so that it is relatively easy to force a fingertip in between the panels. This requirement restricts the design freedom, and may still result in a device that is not very easy to open in all circumstances.

DISCLOSURE

On this background, the aspects of the disclosed embodiments provide a portable electronic device with a first panel and a second panel connected to the first panel. The connection allows the panels to pivot relative to one another between a folded position and an un-folded position. A lock automatically engages and locks the panels when the panels are brought in the folded position and disengages when the panels are displaced relative to one another sidewardly.

By allowing the panels to unlock by a sideward displacement the user can easily disengage the lock with one hand. The user does not have to put their thumb or fingertip into a groove on the side of the phone to open it. The design of the phone is not independent of the unlocking mechanism since no thumb groove is needed. No small motors are needed to aid the panels to open and no buttons are needed to open the device.

The pivotable connection may allow the panels to be displaced relative to one another when they are in the folded position.

The panels can be resiliently biased in the direction opposite to the direction in which the relative displacement disengages said lock.

The panels can be resiliently biased to pivot towards the un-folded position

The pivotable connection can be a hinge.

A spring or other resilient element can be disposed in said hinge to urge said panels to the unfolded position and/or to urge the panels in the direction opposite to the direction in which the relative displacement disengages said lock.

The lock can be disposed inside said hinge.

In another aspect, a method is provided for disengaging the panels of an electronic device with a first panel, and a second panel connected to the first panel by a pivotable connection that allows the panels to pivot relative to one another between a folded position and an un-folded position comprising automatically locking the panels when the panels are brought in the folded position and disengaging the panels when the panels are displaced relative to one another sidewardly.

Further aspects, features, advantages and properties of the electronic device and method according to the disclosed embodiments will become apparent from the detailed description.

BRIEF DESCRIPTION OF THE DRAWINGS

In the following detailed portion of the present description, the aspects of the disclosed embodiments will be explained in more detail with reference to the exemplary embodiments shown in the drawings, in which.

DETAILED DESCRIPTION OF PREFERRED EMBODIMENTS

In the following detailed description, the mobile electronic device according to the teachings for this application will be described by the embodiments.

Figure 2:
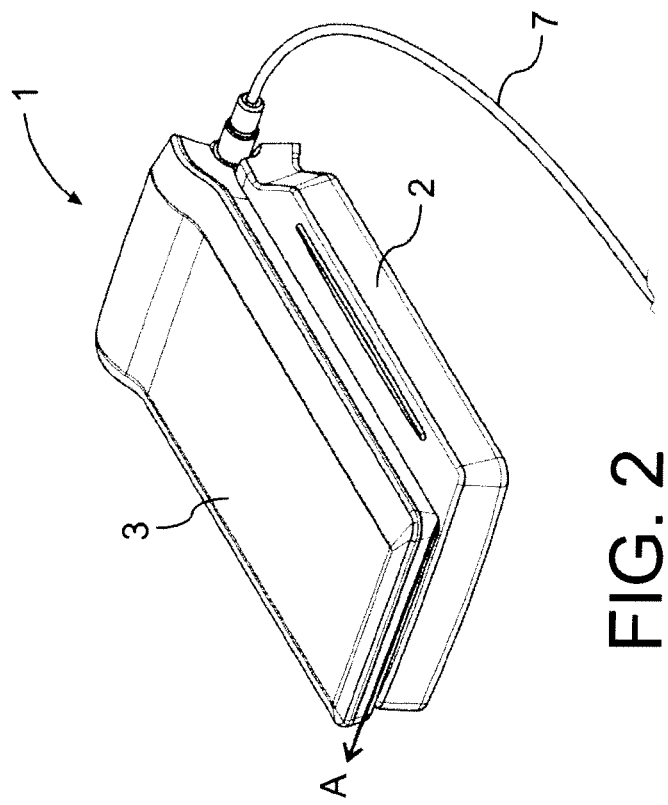
FIG. 2 is elevated view of the device shown in FIG. 1 in a folded position during disengagement of a lock.
Figure 1:
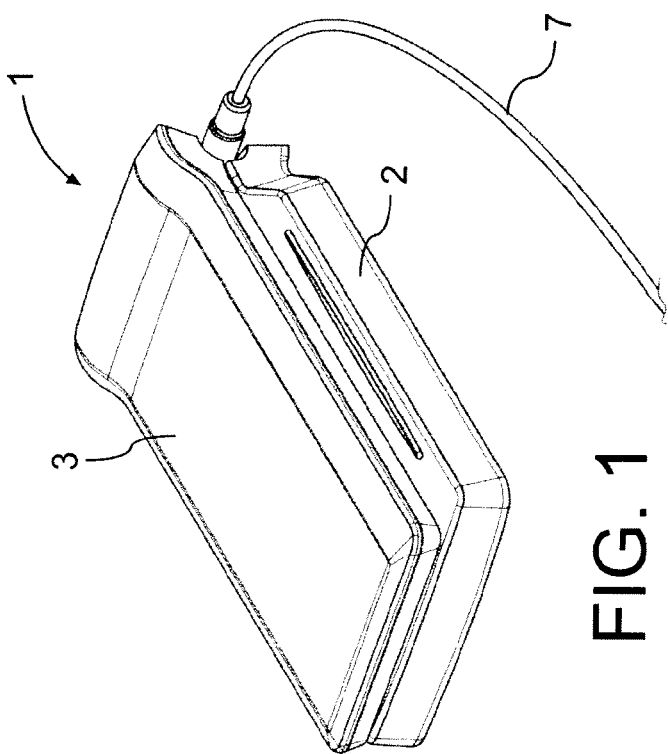
FIG. 1 is an elevated view illustrating the folded position of the device according to an embodiment.
Figure 4:
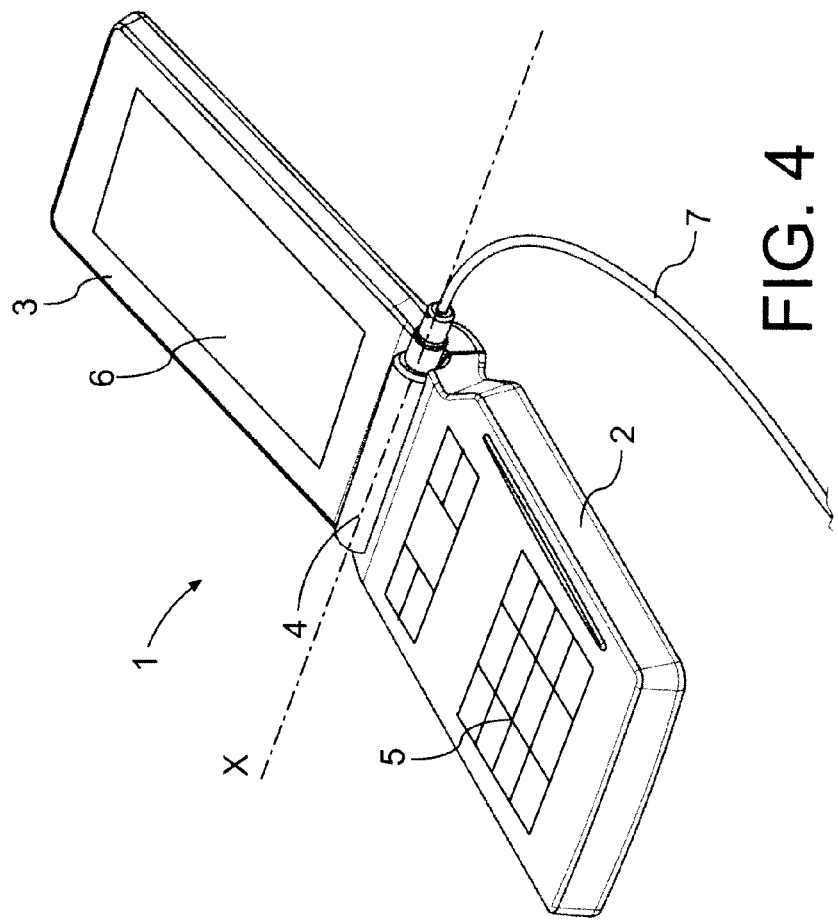
FIG. 4 is an elevated view of the device shown in FIGS. 1, 2 and 3 in a completely unfolded position.
Figure 3:
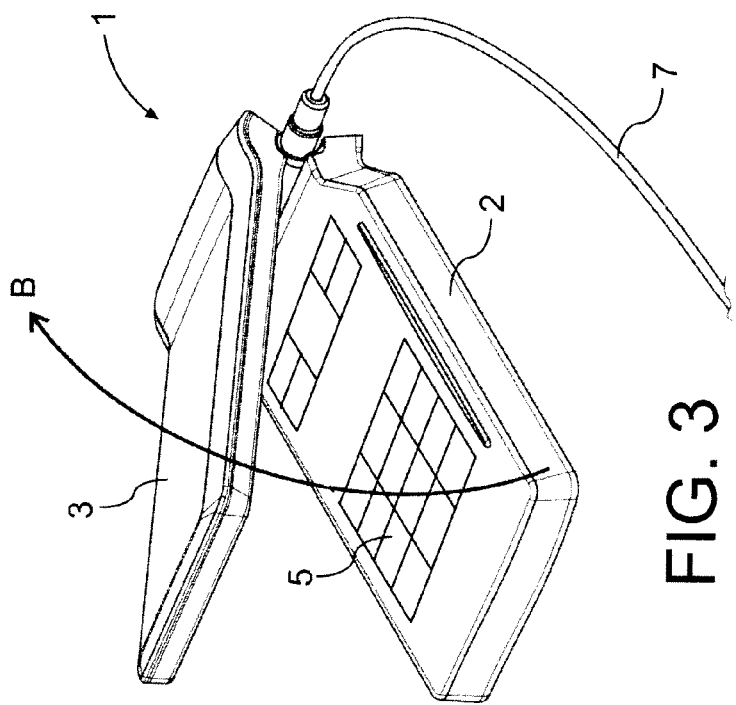
FIG. 3 is an elevated view of the device shown in FIGS. 1 and 2 in an unfolded position.

FIGS. 1 to 4 illustrate an embodiment of a device in the form of a mobile telephone 1 by a series of elevated views. In FIG. 1 in the device 1 is in a folded position with the two panels 2, 3 of the device in a folded together. In FIG. 2 in the panels 2, 3 have been displaced sidewardly relative to one another in the folded position in the direction of the arrow A and now a lock that kept the panels in the folded position has been disengaged. In FIG. 3 the panels 2, 3 have been pivoted in the direction of the arrow B someway towards a fully unfolded position and are in an unfolded position. In FIG. 4 the panels 2, 3 have been pivoted further in the direction of arrow B and have arrived in a fully unfolded position.

The device 1 is provided with a user interface having a panel 2 and a panel 3, an input area such as e.g. a keypad 5 or a touchpad, and a display screen 6 (can be a touch screen). The user interface includes further elements, such as a speaker and a microphone but they are not shown in the figures.

The phone 1 according to the present embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as Universal Mobile Access (UMA).

Panel 2 and panel 3 are connected to one another at a hinge 4 which allows the panels to pivot relative to one another between the folded position of FIGS. 1 and 2 via a range of intermediate unfolded positions of which one is shown in FIG. 3 to a fully unfolded position shown in FIG. 4. The hinge 4 also allows the panels 2, 3 to be displaced relative to one another in a direction substantially parallel or substantially along the pivot axis X to a limited extent. This movement is illustrated by arrow A.

The pivot and displacement mechanism in the hinge is not shown and can be of any known type suitable for a flip type portable or mobile electronic device.

The lock that automatically engages and locks the panels in the folded position is disposed inside the hinge 4 and not visible in the drawings. According to another embodiment (not shown) the lock is not disposed in the hinge, but is e.g. disposed in the ends of the panels opposite to the hinge and in the form of a magnetic lock.

The panels 2, 3 are resiliently biased towards the (completely) unfolded position by a resilient means that are disposed inside the hinge 4. The constructional details of the means that cause the panels 2, 3 to be resiliently biased towards the unfolded position are not shown but are well-known in the art.

The panels 2, 3 are resiliently biased in the direction opposite to the direction of the displacement between the panels 2, 3 in which the lock disengages, i.e. the panels 2, 3 are resiliently biased in the direction opposite to arrow A.

In the folded position shown in FIG. 1 the keypad is covered and a major portion of the panels 2 and 3 overlie one another. The overlap of the panels 2 and 3 can be complete or alternatively at least a major portion of the panels 2 and 3 overlap.

In the folded position the housing of the device 1 is small and compact and the keypad 5 and the display 6 are concealed and protected.

In unfolded positions the interior of the mobile phone 1 is unveiled and the device 1 is ready for use since the keypad 5 and the display 6 are now accessible.

Figure 5:
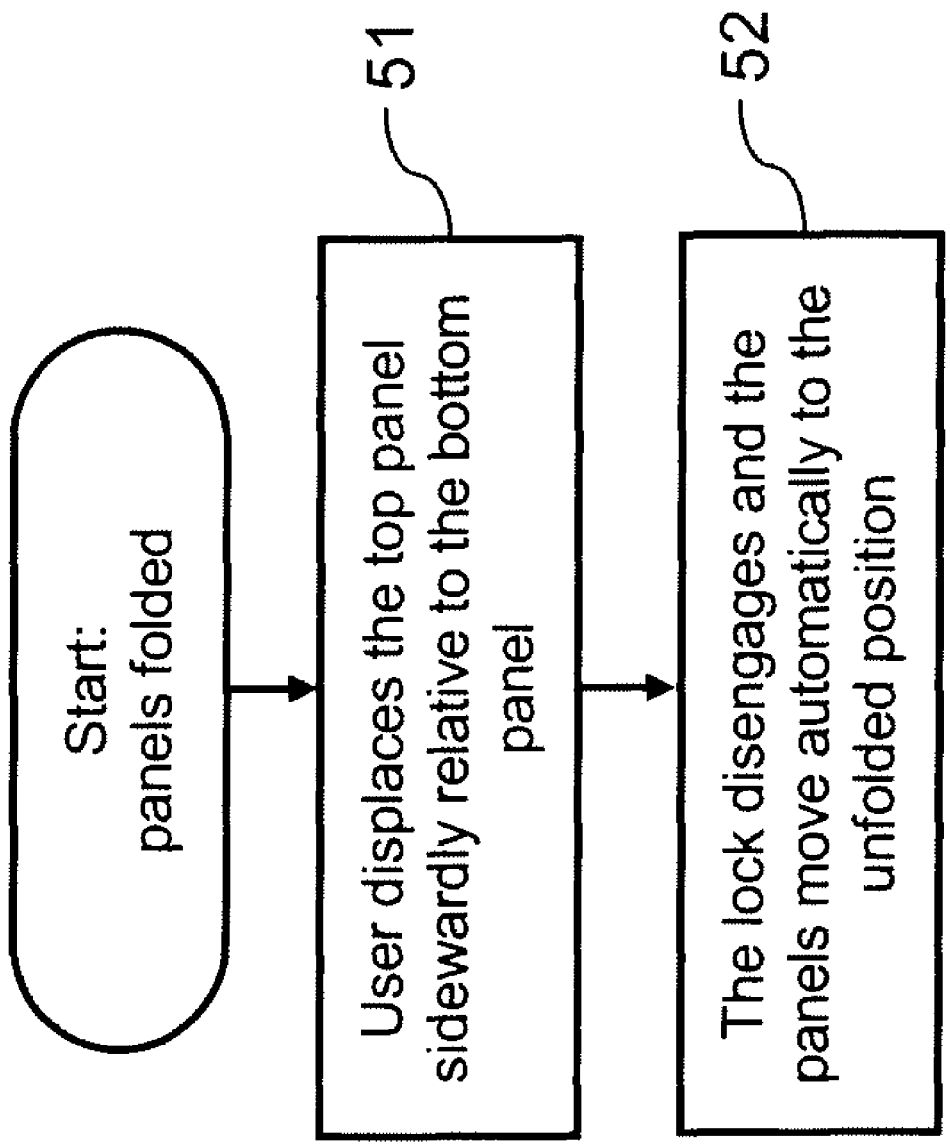
FIG. 5 is a flowchart of an embodiment.

As illustrated with reference to the flowchart in FIG. 5, during use, a user can grip the (folded) phone with one hand and urge/displace the top panel 3 relative to the bottom panel 2 in the direction of the arrow A against the bias of the resilient means in the hinge 4 to thereby disengage the lock and unlock the panels 2, 3 (box 51), where after the resiliently biased panels 2, 3 will automatically move to the fully unfolded position (box 52).

When the user no longer needs to have the mobile phone 1 in the unfolded position, he/she can force the panels 2, 3 against the resilient bias back to the folded position in which the lock automatically engages and ensures that the panels 2, 3 are kept in the folded position until the user again urges these panels 2, 3 to be displaced relative to one another in the direction of the arrow A.

It is noted that the panels 2 and 3 in FIG. 1 do not completely overlap in the non-displaced position. The part of panel 2 that protrudes is useful for reminding the user of the release mechanism and is ergonomically advantageous.

However, according to an embodiment (not shown) the panels 2 and 3 overlap completely or substantially completely in the non-displaced position.

The various aspects of the device described above can be used alone or in various combinations.

The teaching of this application has numerous advantages. Different embodiments or implementations may yield one or more of the following advantages. It should be noted that this is not an exhaustive list and there may be other advantages which are not described herein. One advantage of the teaching of the disclosed embodiments is that the user does not have to put their thumb into a groove on the side of the device to open it. It is another advantage that the design of the phone is independent of the unlocking mechanism, e.g. no thumb groove is needed. It is yet another advantage that no motors are needed to aid the front panels of the device to open. It is a further advantage that no buttons are needed to open the device.

Although the teaching of this application has been described in detail for purpose of illustration, it is understood that such detail is solely for that purpose, and variations can be made therein by those skilled in the art without departing from the scope of the teaching of this application.

For example, although the teaching of this application has been described in terms of a mobile phone, it should be appreciated that the disclosed embodiments may also be applied to other types of electronic devices, such as cameras, video recorders, music players, palmtop computers and the like. It should also be noted that there are many alternative ways of implementing the methods and apparatuses of the teaching of this application. For example, although the pivot axis has been described as a simple pivot axis, it should be noted that other constructions that result in a pivoting capability without a clearly defined pivot axis, can also be used.

The term "comprising" as used in the claims does not exclude other elements or steps. The term "a" or "an" as used in the claims does not exclude a plurality.

The invention claimed is:

1. An electronic device comprising:
   a first panel, and a second panel connected to the first panel by a pivotable connection that allows the panels to pivot relative to one another about a hinge axis between a folded position and an un-folded position,
   a lock that automatically engages and locks the panels when the panels are brought in the folded position and disengages when the panels are displaced relative to one another in a direction substantially along and parallel to the hinge axis.

2. A device according to claim 1, wherein said pivotable connection allows the panels to be displaced relative to one another when they are in the folded position.

3. A device according to claim 1, wherein said panels are resiliently biased in the direction opposite to the direction in which the relative displacement disengages said lock.

4. A device according to claim 1, wherein said panels are resiliently biased to pivot towards the un-folded position.

5. A device according to claim 1, wherein said pivotable connection is a hinge.

6. A device according to claim 5, wherein a spring or other resilient element is disposed in said hinge to urge said panels to the unfolded position and/or to urge the panels in the direction opposite to the direction in which the relative displacement disengages said lock.

7. A device according to claim 5, wherein said lock is disposed inside said hinge.

8. The device of claim 1 wherein the panels are displaced sidewardly relative to one another to disengage the lock.

9. A method for disengaging the panels of an electronic device with a first panel, and a second panel connected to the first panel by a pivotable connection that allows the panels to pivot relative to one another about a pivot axis between a folded position and an un-folded position, the method comprising:
   automatically locking the panels when the panels are brought in the folded position and disengaging the panels when the panels are displaced relative to one another sidewardly substantially along and parallel with the pivot axis.

10. The method of claim 9, wherein said pivotable connection allows the panels to be displaced relative to one another when they are in the folded position.

11. The method of claim 9 wherein said panels are resiliently biased in the direction opposite to the direction in which the relative displacement disengages a lock that automatically engages and locks the panels when the panels are brought in the folded position.

* * * * *

UNITED STATES PATENT AND TRADEMARK OFFICE
CERTIFICATE OF CORRECTION

| | | |
|---|---|---|
| PATENT NO. | : 8,089,749 B2 | Page 1 of 1 |
| APPLICATION NO. | : 12/175767 | |
| DATED | : January 3, 2012 | |
| INVENTOR(S) | : Renwick | |

It is certified that error appears in the above-identified patent and that said Letters Patent is hereby corrected as shown below:

Claim 1, col. 4, line 23 delete "automatically".

Claim 6, col. 4, line 39 insert -- perform at least one of -- in between to and urge.

Claim 6, col. 4, line 40 delete "and/or to" and insert -- and --.

Claim 9, col. 4, line 53 delete "automatically".

Signed and Sealed this
Twentieth Day of March, 2012

David J. Kappos
*Director of the United States Patent and Trademark Office*